United States Patent [19]
Bordoloi et al.

[11] Patent Number: 5,187,235
[45] Date of Patent: Feb. 16, 1993

[54] ENERGY-CURABLE ACRYLIC PRESSURE-SENSITIVE ADHESIVES

[75] Inventors: Binoy K. Bordoloi, Newhall; Sebastian S. Plamthottan, Pasadena; Yehuda Ozari; Robert Van Ham both of Arcadia, all of Calif.

[73] Assignee: Avery Dennison Corporation, Pasadena, Calif.

[21] Appl. No.: 815,593

[22] Filed: Dec. 27, 1991

Related U.S. Application Data

[63] Continuation of Ser. No. 522,471, May 11, 1990, abandoned, which is a continuation of Ser. No. 211,130, Jun. 22, 1988, abandoned, which is a continuation of Ser. No. 916,717, Oct. 8, 1986, abandoned.

[51] Int. Cl.$^5$ .............................................. C08F 265/04
[52] U.S. Cl. ................................ 525/305; 526/318.43; 522/121
[58] Field of Search ............. 526/317.1, 323.2, 318.43; 525/305; 522/121

[56] References Cited

U.S. PATENT DOCUMENTS

| | | | |
|---|---|---|---|
| 2,544,692 | 3/1951 | Kugler et al. | 428/355 |
| 2,642,414 | 6/1953 | Bauer et al. | 526/329.5 |
| 3,479,246 | 11/1969 | Stapleton | 526/323.2 |
| 3,654,213 | 4/1972 | Christenson et al. | 526/317.1 |
| 3,725,115 | 4/1973 | Christenson et al. | 427/208.4 |
| 3,971,766 | 7/1976 | Ono et al. | 526/323.2 |
| 4,069,123 | 1/1978 | Skoultchi et al. | 427/54.1 |
| 4,220,744 | 9/1980 | Tulacs et al. | 526/325 |
| 4,421,817 | 12/1983 | Pina et al. | |
| 4,529,772 | 7/1985 | Druschke et al. | |

FOREIGN PATENT DOCUMENTS

| | | | |
|---|---|---|---|
| 0225102 | 6/1987 | European Pat. Off. | |
| 53-64242 | 6/1978 | Japan | 526/323.2 |
| 56-147809 | 11/1981 | Japan | 526/323.2 |
| 57-125277 | 8/1982 | Japan | 526/317 |
| 58-189274 | 11/1983 | Japan | 526/317 |
| 60-99183 | 6/1985 | Japan | 526/317.1 |
| 62-121716 | 6/1987 | Japan | |
| 937468 | 6/1982 | U.S.S.R. | 526/317 |
| 1174914 | 12/1969 | United Kingdom | |

Primary Examiner—Joseph L. Schofer
Assistant Examiner—N. Sarofim
Attorney, Agent, or Firm—Christie, Parker & Hale

[57] ABSTRACT

There is provided a radiation-curable, pressure-sensitive-adhesive layer formed of at least one monomer having a glass-transition temperature greater than about −25° C. and an entanglement molecular-weight less than about 20,000; at least one monomer having a glass-transistion temperature less than about −25° C. and an entanglement molecular-weight greater than about 20,000; and at least one tackifier monomer having a glass-transistion temperature greater than −25° C. and an entanglement molecular-weight of at least about 20,000 and present in an interpolymerized amount sufficient to form an interpolymer having a glass-transition temperature less than about −25° C. and an entanglement molecular-weight greater than about 20,000. Cure is preferably by electron beam, and a multifunctional monomer is preferably provided to improve shear.

12 Claims, 4 Drawing Sheets

ENERGY-CURABLE ACRYLIC PRESSURE-SENSITIVE ADHESIVES

CROSS-REFERENCE TO RELATED APPLICATIONS

This is a continuation of application Ser. No. 07/522,471, filed May 11, 1990 now abandoned, which is a continuation of application Ser. No. 07/211,130, filed Jun. 22, 1988 now abandoned, which is a continuation of application Ser. No. 06/916,717, filed Oct. 08, 1986 now abandoned.

BACKGROUND OF THE INVENTION

The present invention is directed to curing by radiation, particularly electron-beam (EB) radiation, of pressure-sensitive, acrylic-based interpolymers containing an interpolymerized amount of tackifier monomers, as defined herein.

U.S. Pat. No. 2,544,692 to Kuegler et al discloses copolymerization of an acrylic acid with minor amounts of a fumarate diester. Emulsion and bulk polymerization are stated as being feasible. A pressure-sensitive-adhesive product is disclosed.

U.S. Pat. No. 2,642,414 to Bauer et al discloses copolymers of esters of methacrylic acid, a saturated aliphatic monohydric alcohol, a maleinoid ester of a saturated aliphatic monohydric alcohol of from 4 to 14 carbon atoms, and certain organic acids. The maleinoid esters include dibutyl fumarate. The products of the reaction are disclosed to have utility in modifying the pour point of hydrocarbon oils.

U.S. Pat. No. 4,220,744 to Tulacs et al discloses the use of two-stage bulk polymerization to form a viscous liquid containing interpolymerized amounts of dialkyl esters of fumaric or maleic acid.

The curing of monomers as well as polymers to induce or improve pressure-sensitive properties is old in the art. Of relevance to the overall concept is U.S. Pat. No. 3,725,115 to Christenson et al, who disclose the preparation of pressure-sensitive adhesives by irradiating a hot-melt composition. The compositions disclosed are coated on release liners and subjected to electron-beam radiation of a dosage of from 6 to 8 megarad (60 to 80 kiloGray), leading to high peel strengths. The improved adhesive is then transferred to the face stock.

U.S. Pat. No. 4,069,123 to Skoultchi et al discloses the UV curing of homopolymers of alkyl esters of acrylic and methacrylic acids and of copolymers of such monomers with other comonomers, including $C_1$-$C_4$ alkyl half-esters of maleic and fumaric acids. The polymers are disclosed as being formed by bulk, solvent or emulsion polymerization.

It has not been heretofore known to use $C_1$-$C_3$ lower alkyl diesters of unsaturated dicarboxylic acids in combination with energy curing, to enhance adhesive properties. This, in part, is the subject matter of the instant invention.

SUMMARY OF THE INVENTION

According to the present invention there are provided hot-melt-coatable, radiation-curable acrylic polymers produced by interpolymerization of at least one first monomer having a glass-transition temperature (Tg) less than about $-25°$ C. and an entanglement molecular-weight (Me) greater than about 20,000; at least one second monomer having a glass-transition temperature greater than about $-25°$ C. and an entanglement molecular-weight less than about 20,000; and at least one tackifier monomer having a glass-transition temperature greater than about $-25°$ C. and an entanglement molecular-weight greater than about 20,000, and present in an amount sufficient to provide a polymer having an entanglement molecular-weight greater than about 20,000 and a glass-transition temperature less than about $-25°$ C. It is preferred that the tackifier monomer be an alkyl diester of an unsaturated dicarboxylic acid containing 4 carbon atoms in which each alkyl group independently contains from 1 to 3 carbon atoms. Isomeric alkyl acrylates and alkyl methacrylates may also be used as tackifier monomers.

The acrylic polymers of the instant invention are radiation-curable. Electron-beam curing is presently preferred. Even though formed by bulk polymerization, the acrylic polymers exhibit properties which enable replacement of solvent-formed, acrylic pressure-sensitive adhesives. As indicated, the polymers produced in accordance with the instant invention are controlled as to molecular properties by the tackifier monomer selected, in combination with the balance of the total monomer composition.

Typically, the copolymers provided in accordance with the instant invention comprise from about 55% to about 90% by weight based on the total weight of the monomers, a first monomer having a glass-transition temperature less than about $-25°$ C. and an entanglement molecular-weight greater than 20,000; and, typically, up to about 30% by weight, preferably from about 5% to about 30% by weight, based on the weight of total monomers, of at least one tackifier monomer; the balance comprising a second monomer having a glass-transition temperature greater than about $-25°$ C. and an entanglement molecular-weight less than about 20,000. The preferred second monomers are unsaturated carboxylic acids, preferably acrylic acid. The preferred first monomers are alkyl acrylates, preferably 2-ethylhexyl acrylate and/or butyl acrylate. The presently preferred tackifier monomer is diethyl fumarate.

Products are formed by directly or indirectly casting onto a face material, the adhesive as disclosed herein, preferably one including a multifunctional monomer as defined herein. The hot-melt application is preferred. Application from a solvent is also feasible. The cast adhesive is cured by radiation, preferably EB radiation. For EB radiation, the multifunctional monomer reduces the energy required to improve adhesive properties, and in any event will be used in an amount up to about 200 kiloGray (kGy), preferably up to about 100 kiloGray.

BRIEF DESCRIPTION OF THE DRAWINGS

FIG. 1 graphically illustrates the regions occupied by the tackifier monomer(s), first monomers, second monomers, and rubber-forming polymers when amorphous, wherein:

PI = Polyisoprene
PB = Polybutadiene
PDMS = Polydimethyl Siloxane
PE = Polyethylene
S = Styrene
MMA = Methyl Methacrylate
AA = Acrylic Acid
VA = Vinyl Acetate
MA = Methyl Acrylate
EA = Ethyl Acrylate
BA = Butyl Acrylate 2-MBA = 2-Methyl Butyl Acrylate
2-EHA = 2-Ethyl Hexyl Acrylate
DBF = Dibutyl Fumarate
t-BA = t-Butyl Acrylate
MBM = Mono-Butyl Maleate
β-CEA = β-Carboxy Ethyl Acrylate
2-HEA = 2-Hydroxy Ethyl Acrylate
BMA = Butyl Methacrylate
DMF = Dimethyl Fumarate
DEF = Diethyl Fumarate
DPF = Dipropyl Fumarate

DETAILED DESCRIPTION

Figure 1:
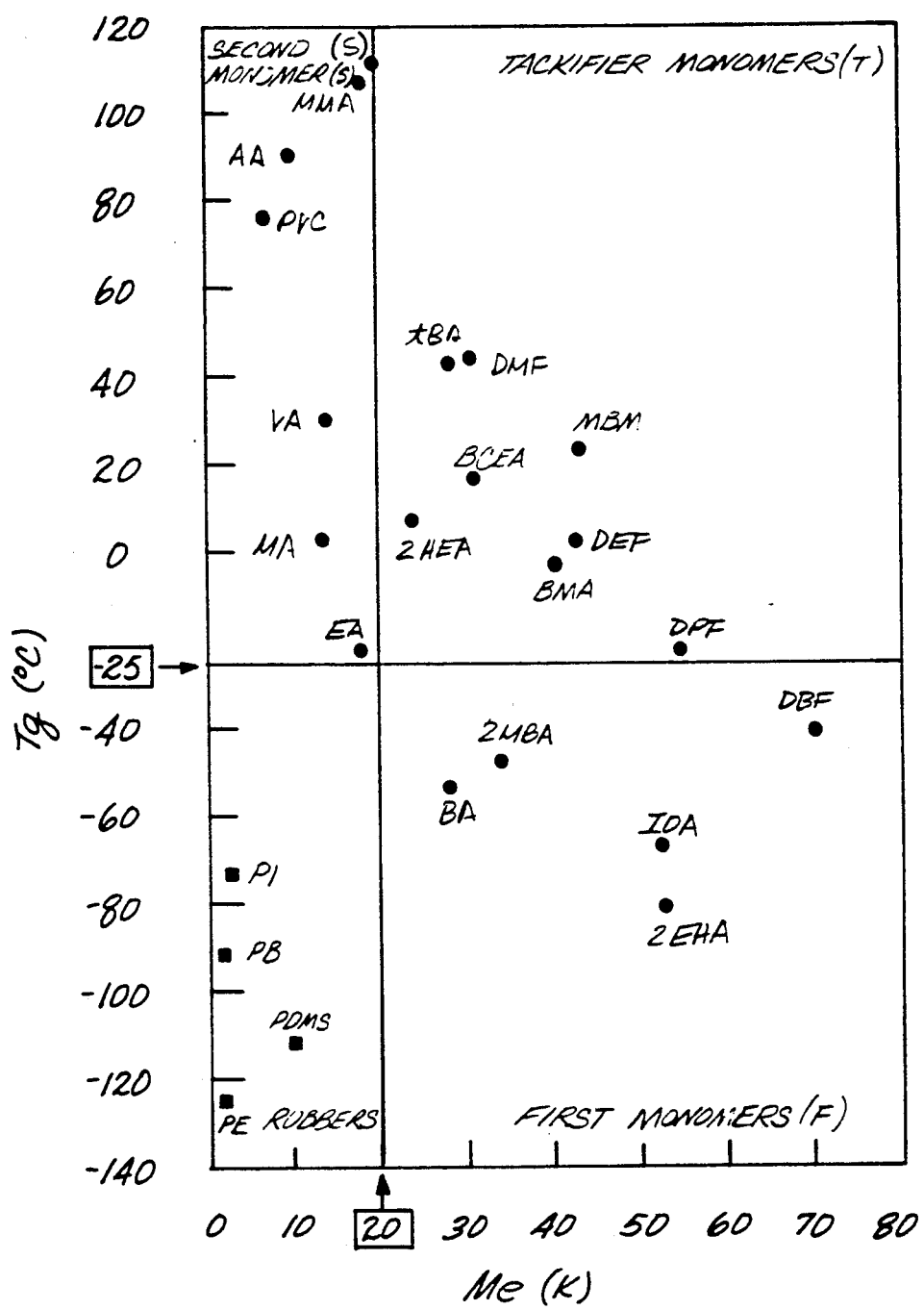

The present invention is directed to the use of uncommon tackifier monomers to provide radiation-curable, preferably electron-beam-curable, acrylic pressure-sensitive adhesives in which a tackifier monomer is effectively used to control the glass-transition temperature and entanglement molecular-weight of the polymer produced. The polymers formed in accordance with the instant invention are preferably prepared by bulk polymerization and are typically applied as hot-melt adhesives, although solvent-casting techniques may also be used. Certain adhesive properties, such as high-temperature shear, are enhanced by radiation curing, preferably electron-beam (EB) curing, the necessary level of which is reduced by the presence of a multifunctional monomer.

The polymers formed in accordance with the instant invention comprise, in addition to the tackifier monomer, at least one first monomer having a glass-transition temperature less than about −25° C. and an entanglement molecular-weight greater than about 20,000, and at least one second monomer having glass-transition temperature greater than about −25° C. and an entanglement molecular-weight less than about 20,000. The combination provides greater latitude as to polymer properties, as compared with two-component monomer systems.

"Entanglement molecular-weight" as used herein is defined in *Viscoelastic Properties of Polymers*, 3rd Ed., John Ferry, John Wiley and Sons, 1981, incorporated herein by reference, and can be calculated using the formula:

$$M_e = 5.4 \times 10^4 \frac{\Sigma M}{\Sigma N} \left[ \frac{\Sigma V}{\Sigma N} - 1.48 \times 10^{-5} \right]^{-\frac{1}{2}}$$

where:
M = molar weight of group
N = number of main chain carbon atoms per group
V = group contribution to molar volume The formula, M, N, and V are explained and supported in detail in *Computer Aided Design of Polymers and Composites*, D. Kaeble, Marcel Dekker, Inc., 1985, pgs. 116 to 121, incorporated herein by reference.

By "tackifier monomer" there is meant herein a monomer which, if homopolymerizable, would polymerize to a polymer which does not have pressure-sensitive adhesive properties and which has a glass-transition temperature greater than about −25° C. and an entanglement molecular-weight greater than 20,000. The monomers include lower alkyl diesters of unsaturated dicarboxylic acids in which the alkyl group contains up to 3 carbon atoms, isomeric acrylates (e.g. t-butyl acrylate), and lower alkyl methacrylates (e.g. butyl methacrylate).

The tackifier monomer is provided in an amount determined by the physical properties of the desired hot-melt, pressure-sensitive adhesives, typically in an amount of up to about 30% by weight, preferably from about 5% to about 30% by weight, based on the total weight of the monomers.

Diesters of unsaturated dicarboxylic acids useful as tackifier monomers are those in which the unsaturated carboxylic-acid-group contains 4 carbon atoms and in which each alkyl-diester group independently contains from 1 to 3 carbon atoms. Diesters of fumaric acid are preferred, with diethyl fumarate being most preferred. Also useful are isomeric acrylates such as tert-butyl acrylate, isopropyl acrylate and the like, and methacrylates such as normal or tert-butyl methacrylates and the like.

Various functional monomers such as hydroxy ethyl acrylate, beta-carboxy ethyl acrylate, fumaric acid, itaconic acid and the like, may also be included.

"First monomers" as used herein are monomers having a glass-transition temperature less than about −25° C. and an entanglement molecular-weight of greater than about 20,000. Included are butyl acrylate, 2-methylbutyl acrylate, 2-ethylhexyl acrylate and the like, as well as the higher alkyl esters of unsaturated dicarboxylic acids containing 4 carbon atoms, such as dibutyl fumarate and the like. Butyl acrylate and/or 2-ethylhexyl acrylate are preferred. Concentration may be from about 55% to about 90% by weight, based on the total weight of the monomers.

"Second monomers" as used herein are monomers which have a glass-transition temperature greater than −25° C. and an entanglenment molecular-weight of less than 20,000, and include, among others, some alkyl methacrylates such as methyl methacrylate; the like; copolymerizable vinyl unsaturated monomers such as vinyl acetate; styrenic monomers such as styrene and the like; and unsaturated carboxylic acids such as acrylic acid and methacrylic acid. Acrylic acid is preferred, and is normally present in an amount of from about 1% by weight to about 15% by weight or less, based on the total weight of the monomers.

The radiation-curable, hot-melt, pressure-sensitive polymers prepared in accordance with the instant invention, in order to be useful as pressure-sensitive adhesives, must have a net effective glass-transition temperature of from about 30° C. to 70° C. below the use-temperature. For purposes of the instant invention, for the adhesive to be pressure-sensitive at ambient temperature (about 25° C.), the criterion is that the polymers have a glass-transition temperature of less than about −25° C., and the additional criterion is that the entanglement molecular-weight be greater than about 20,000.

FIG. 1 shows some of the tackifier monomers, first monomers, and second monomers in the regions in which they fall relative to each other. The lower-left-hand quadrant shows zones occupied by monomers which normally lead to the formation of amorphous rubbers, and as such are not included in the invention.

As the polymers produced in accordance with the instant invention are radiation-curable by any suitable means, EB curing is preferably used to improve adhesive properties, particularly shear. The dosage levels for EB curing may be up to about 200 kiloGray (kGy), preferably up to about 100 kGy, and are materially reduced by inclusion of a multifunctional monomer. For EB cure, weight-average molecular-weight should be at least about 100,000. Ultraviolet radiation and gamma radiation may also be used, but are more costly and therefore less desired than EB curing.

"Multifunctional monomers" as used herein means monomers having 2 or more pendant acrylate or methacrylate groups which enable crosslinking of the cast adhesive coating in the production of pressure-sensitive adhesive stock, tapes, labels and the like. Illustrative monomers include pentaerythritol triacrylate (PETA), triethyleneglycol diacrylate, triethyleneglycol dimethacrylate, trimethylol propane trimethacrylate, trimethylol propane triacrylate, tripropyleneglycol diacrylate, tripropyleneglycol dimethacrylate, 1,3-butyleneglycol dimethacrylate, tetraethyleneglycol dimethacrylate and the like. The concentration of multifunctional monomer may be up to about 8% by weight, more preferably from about 1% to about 5% by weight, based on the total weight of the monomers of the hot-melt adhesive. Its inclusion enables the lowering of the energy dosage required to improve shear, particularly elevated-temperature shear.

In production, the curable polymer is hot-melt-coated directly onto the facestock, or onto a transfer surface then applied to the facestock. The latter is preferred where uniformity of the adhesive coat is desired. EB-cure is then utilized to raise shear.

The presently preferred compositions of the instant invention contain, on an interpolymerized basis, from about 5% to about 30% by weight diethyl fumarate; from about 55% to about 95% by weight butyl acrylate; and from about 2% to about 20% by weight acrylic acid, and include multifunctional monomers to reduce the energy required to induce crosslinking by EB radiation.

Radiation-curable, preferably EB-curable, acrylic polymers may be produced in accordance with the instant invention, by bulk and solvent polymerization using a free radical catalyst. Bulk polymerization is preferred for economy.

Figure 2:
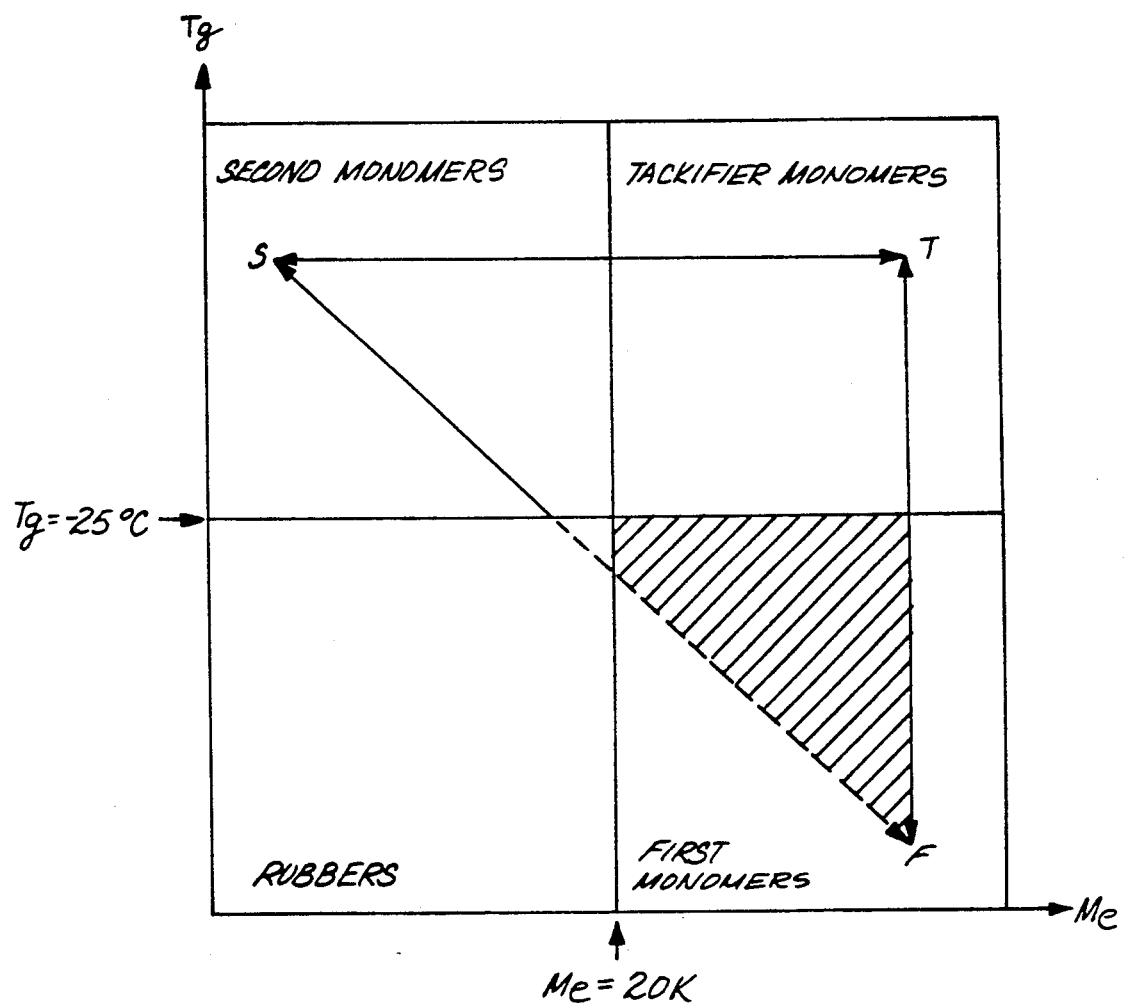
FIG. 2 shows the region in which a pressure-sensitive adhesive can be formulated using a first monomer, a second monomer, and a tackifier monomer in accordance with the instant invention.
Figure 3:
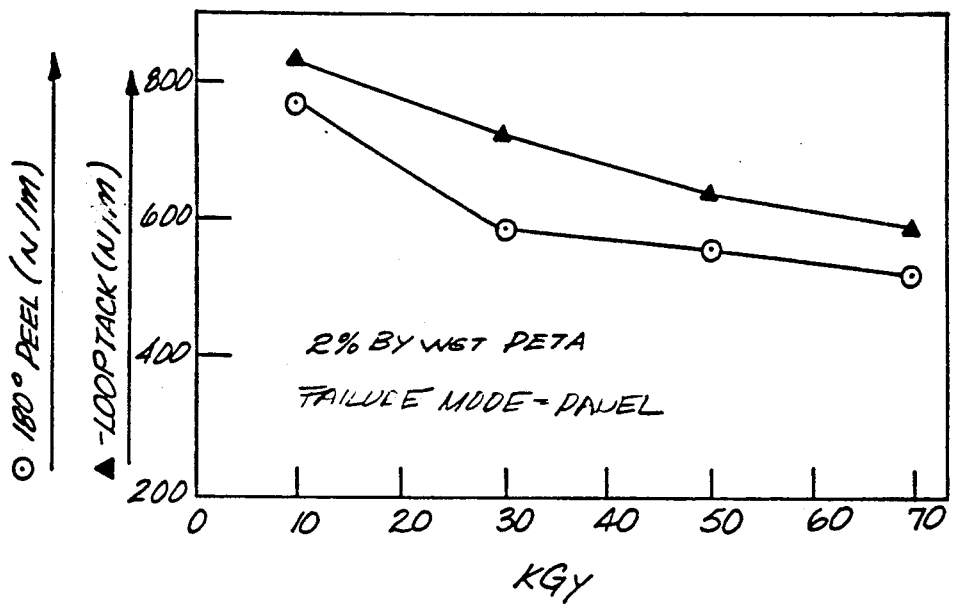
FIGS. 3 and 4, respectively, show 180° peel and loop tack in Newtons per meter, as well as 70° C. shear and room-temperature shear at 500 g load and 1.27 cm × 1.27 cm overlap, in kiloseconds, for a pressure-sensitive adhesive provided in accordance with the instant invention and containing 12 mole % diethyl fumarate, 78 mole % butyl acrylate, 10 mole % acrylic acid, and 2% by weight pentaerythritol triacrylate (PETA) at various dosage levels in kiloGray (kGy). Such an adhesive is applied to a facestock at a coating weight of about 47 g/m².

With reference now to FIG. 2, there is shown a system for a first monomer (F), a second monomer (S), and a tackifier monomer (T). If only the first and second monomers were employed, the resultant polymers would have properties limited by the line F-S. By adding the third component T, there is created the shaded region of polymer properties, rather than the line F-S. Accordingly, the ability to control the glass-transition temperature and entanglement molecular-weight became flexible, which controllability remained unchanged during EB curing. In general, increase of the glass-transition temperature, in the shaded region, at constant entanglement molecular-weight results in an increase in shear, while an increase in entanglement molecular-weight in that region at constant glass-transition temperature results in a higher tack and lower shear, for a constant molecular-weight of the polymer produced. The addition of more components or functional monomers to the system will create quadrinary or higher points defining different zones within the shaded regions of pressure-sensitive adhesives.

Figure 4:
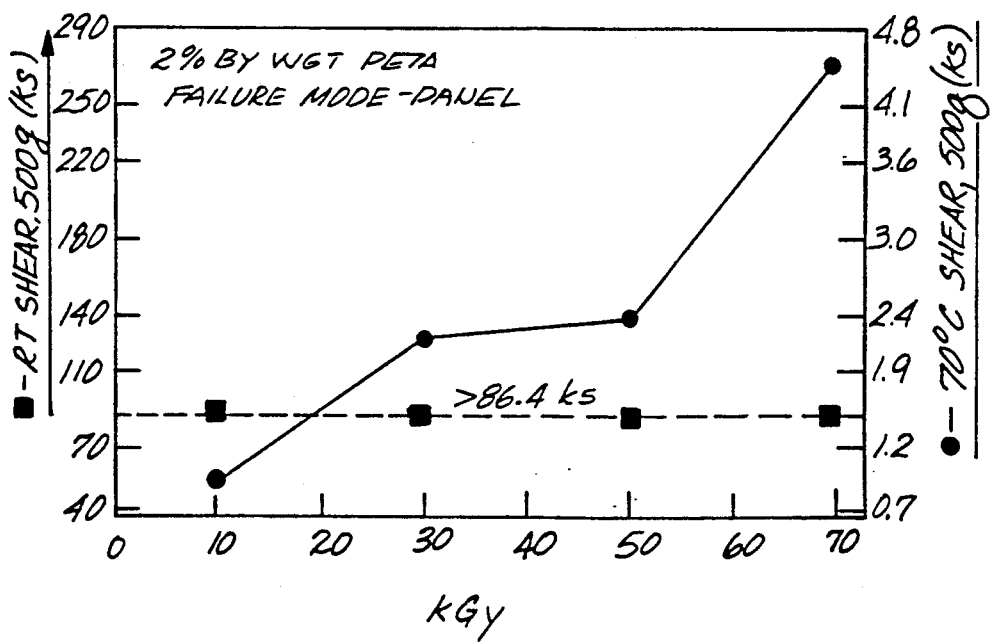
Figure 5:
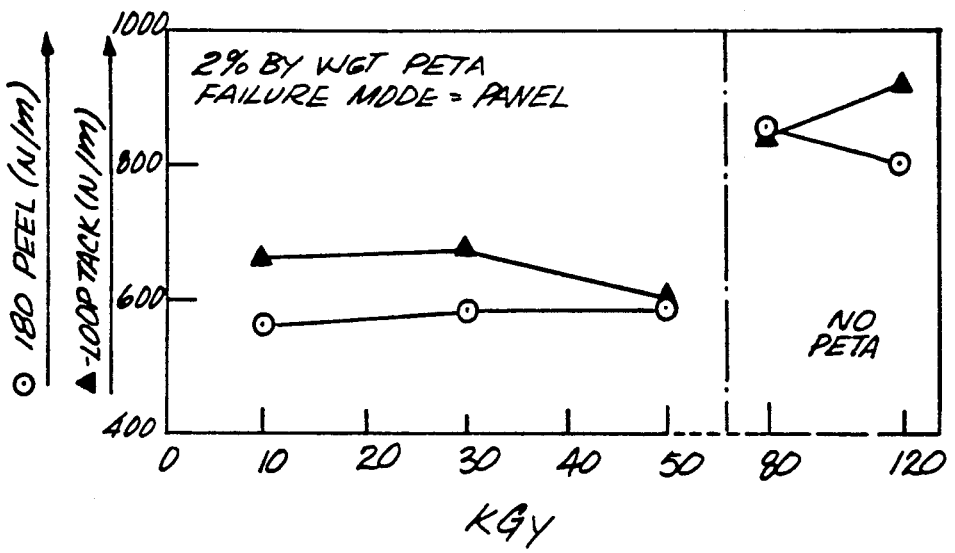
FIGS. 5 and 6 compare with the properties of the EB-cured composition, with and without the use of PETA (2%), for a polymer of the same monomer composition but differing in molecular properties (e.g. molecular weight). Coating weight is about 36 g/m².
Figure 6:
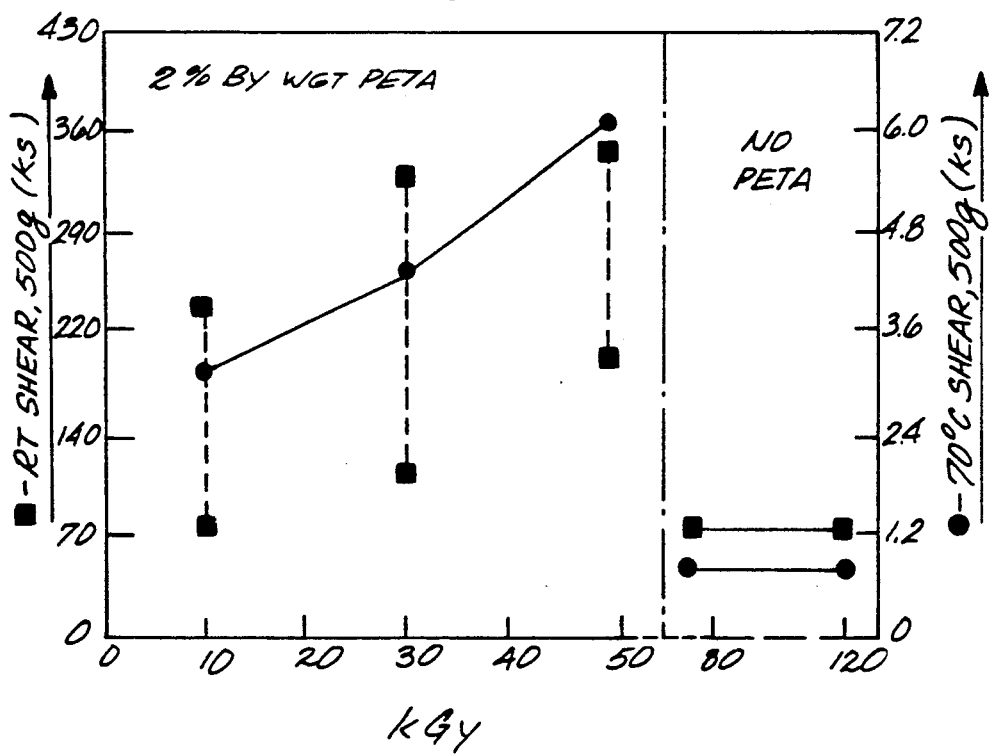

FIGS. 3, 4, 5 and 6 show the effect of the use of a multifunctional monomer as the crosslinking aid to EB curing for the system 12 mole-percent diethyl fumarate, 78 mole-percent butyl acrylate, and 10 mole-percent acrylic acid. The polymer of FIGS. 3 and 4 had a weight-average molecular-weight (Mw) of 267,000 and a ratio of weight-average molecular-weight (Mw) to number-average molecular-weight (Mn) of 24.9. As for FIGS. 5 and 6, Mw was 266,000, and Mw/Mn was 11.1. EB curing and use of a multifunctional monomer as a crosslinking agent tended to reduce peel but increase shear. With reference to FIG. 4, room-temperature (RT) shear was greater than 24 hours for all dosages of EB cure. FIGS. 5 and 6 also show the effect of non-use of a multifunctional monomer, i.e., even at higher dosage levels there was higher peel and tack but lower shear, compared to the use of a multifunctional monomer. The range of room-temperature shear for a given EB dosage with PETA addition is also shown in FIG. 6. The following Examples and Controls illustrate the instant invention. Viscosity (n) is always before cure.

EXAMPLE 1 AND CONTROL I

There were formed by bulk polymerization, hot-melt adhesives based on diethyl fumarate and dibutyl fumarate. In each instance, the first monomer was butyl acrylate and the second monomer was acrylic acid. Table I shows peel-tack-shear performance after curing of the adhesive (Ex. 1) with 50 kGy for a system containing 2% by weight PETA, following application of the adhesive mixture at a coating level of 50 g/m² onto a release liner at 150° C., then laminating the coated release liner to a face material of 2 mil Mylar. A polymer system containing dibutyl fumarate was used as Control I. The substrate was stainless steel. As can be seen with almost equivalent concentrations of monomers, the diethyl fumarate provides an adhesive of improved properties, compared to dibutyl fumarate, at comparable melt viscosities.

TABLE I

| Ct. Wt. = 50 g/m² Mylar/SS % by Weight Monomer | | 180° Peel (N/m) | Loop Tack (N/m) | 70° C. Shear 500 g (ks) | Visc. 150° C./ 2 sec$^{-1}$ (Pa · s) |
|---|---|---|---|---|---|
| BA | AA | | | | |
| DEF | | | | | |
| 15.7 | 78.8 | 5.5 | 558 p | 640 p | 2.3 ps | 40 |
| DBF | | | | | |

TABLE I-continued

| Ct. Wt. = 50 g/m² Mylar/SS % by Weight Monomer | | 180° Peel (N/m) | Loop Tack (N/m) | 70° C. Shear 500 g (ks) | Visc. 150° C./ 2 sec⁻¹ (Pa · s) |
|---|---|---|---|---|---|
| BA | AA | | | | |
| 17.5 | 77.5 | 5.0 | 451 f/c | 584 p | 0.6 ps | 54 | p = panel failure
s = substrate failure
ps = panel stain
c = cohesive failure
f = failure at facestock
N/m = Newtons per meter
ks = kilosecond
SS = stainless steel
Pa · s = Pascal seconds

EXAMPLE 2 AND CONTROL II

A hot-melt pressure-sensitive adhesive was formed by bulk polymerization, and contained 15.7% by weight diethyl fumarate, 78.8% by weight butyl acrylate, 5.5% by weight acrylic acid, and had a glass-transition temperature of −41° C. and an entanglement molecular-weight of 28,000. There was established the ability by EB cure to duplicate the characteristics (i.e., glass-transition temperature and calculated entanglement molecular-weight) of an acrylic based solution polymer.

Testing results are shown in Table II. The solution polymer (Control II), after removal of the solvent by drying, had a melt viscosity at 150° C./2 sec⁻¹ of 800 Pa.s. The solution polymer was then chemically cross-linked.

TABLE II*

Example 2

| | Example 2A$^a$ | Example 2B$^b$ |
|---|---|---|
| Monomer System (% by wgt) | (DEF) 15.7 | (BA) 78.8 | (AA) 5.5 |
| Melt Viscosity (150° C./2 sec⁻¹; Pa · s) | 40 | 70 |
| 180° Peel, N/m | 520 | 596 |
| Loop Tack, N/m | 588 | 600 |
| Room-Temperature Shear$^d$, 500 g (ks) | 86.4+ | 86.4+ |
| 70° C. Shear, 500 g (ks) | 4.6 | 6.5 |

| | Control II$^c$ |
|---|---|
| Melt Viscosity (150° C/2 sec⁻¹; Pa · s) | 800 |
| 180° Peel, N/m | 580 |
| Loop Tack, N/m | 525 |
| Room-Temperature Shear, 500 g (ks) | 86.4+ |
| 70° C. Shear, 500 g (ks) | 4 |

(A) All testing with 2 mil Mylar face material and from stainless steel substrate.
$^a$ = 2% PETA, 70 kGy, 48 g/m² ct. wt.
$^b$ = 2% PETA, 50 kGy, 36 g/m² ct. wt.
$^c$ = dried at 70° C., 50 g/m² ct. wt.
+ = greater than
$^d$ = at 1.27 cm × 1.27 cm overlap

EXAMPLES 3 AND 4 AND CONTROLS III AND IV

This study was to compare the pressure-sensitive adhesive performance of the invention vs. U.S. Pat. No. 4,220,744 as illustrated by its examples. The identification of the Examples and Controls (Examples from the '744 patent) are summarized in Table III. There was used dibutyl fumarate (DBF) and dioctyl fumarate (DOF), instead of diisobutyl fumarate and di-N-octyl fumarate, as the latter are unavailable in the United States. Use of a high level of initiator and no acid, gave very low melt viscosity, e.g., 1 Pa.s polymers. The hot melts of the invention contained acrylic acid and also had a viscosity at least ten times as high, e.g., from 10 to 100 Pa.s at 150° C./2 sec⁻¹.

Pressure-sensitive-adhesive performance of the Examples and Controls was evaluated after compounding each of them with 2% PETA and 600 ppm, of an antioxidant. The compounded hot melts were coated on a release liner at about 50 g/m² coat weight, laminated with a 2-mil Mylar, and EB-cured at 200 kv through the Mylar, at various dosages from 10 through 500 kGy. Adhesive properties were tested using stainless-steel panels. The 180° peel adhesion and loop-tack values were measured at 12 in/min. crosshead speed. Creep resistance at room temperature (or RT shear) was tested with 1/2×1/2 in² (or 1.27 cm×1.27 cm) lapping samples with a 1000 g load.

Pressure-sensitive-adhesive performance of the hot melts is summarized in Table IV. It is observed in Table IV that the materials made by following the '744 patent had zero cohesive strength (i.e., 0.0@1000 g RTS) and very weak adhesion properties (i.e., 180° peel and loop tack) with a cohesive mode of failure. In comparison, the hot melts of the invention had good adhesion properties with a panel mode of failure and also with good cohesive strength.

TABLE III

| Description | Fumarate | Component/ Composition, by Weight | Wt % Initiator (Vazo 67$^d$) | Viscosity @ 150° C./ 2 sec⁻¹ |
|---|---|---|---|---|
| Example 3 | DEF | (DEF/BA/AA) 15/80/5 | 0.30 (DDM = 0.1%) | 78 Pa · S |
| Example 4 | DEF | (DEF/BA/AA) 20/75/5 | 0.30 (DDM = 0.1%) | 52 Pa · S |
| Control III | DBF | (DBF/BA) 10/90 | 2.50 | 0.8 Pa · S |
| Control IV | DOF | (DOF/2-EHA) 12/88 | 1.08 | 1.6 Pa · S |

$^d$ = Vazo 67 initiator is similar to AIBN. The chain transfer agent, Dodecyl Mercaptan (DDM), was used here and in the amount indicated.

TABLE IV

| | Adhesive Performance | | | |
|---|---|---|---|---|
| | | PSA Performance | | |
| Description | EB Dosage (kGy) | 180° Peel (N/m) | Loop Tack (N/m) | 1000 g RTS (ks) |
| Example 3 | 10 | 630 | 630 | 19.0 |
| | 30 | 516 | 533 | — |
| | 50 | 446 | 534 | 3.4 |
| Example 4 | 10 | 980 | 1068 | 0.1 |
| | 30 | 831 | 884 | 1.4 |
| | 50 | 656 | 893 | 6.5 |
| Control III | 10 | 18 | 88 | 0 |
| | 30 | 48 | 184 | 0 |
| | 50 | 79 | 262 | 0 |
| Control IV | 10 | 44 | 158 | 0 |
| | 30 | 79 | 236 | 0 |
| | 50 | 91 | 245 | 0 |

N/m = Newtons per meter
ks = kilosecond

What is claimed is:

1. A cured pressure-sensitive adhesive comprising a copolymer formed of:
   at least one interpolymerized first monomer having a glass-transition temperature less than about 25° C. and an entanglement molecular-weight, said first monomer being selected from the group consisting of 2-ethylhexyl acrylate, butyl acrylate and 2- methylbutyl acrylate greater than about 20,000 and present in an amount of from about 55% to about 90% by weight based on the total weight of the monomers;

at least one interpolymerized second monomer having a glass-transition temperature greater than about −25° C. and an entanglement molecular-weight less than about 20,000 said second monomer being an unsaturated carboxylic acid and present in an amount up to about 25% by weight based on the total weight of the monomers; and at least one interpolymerized tackifier monomer having a glass-transition temperature greater than −25° C. and an entanglement molecular-weight of at least about 20,000, said tackifying monomer being a lower alkyl diester of an unsaturated dicarboxylic acid containing 4 carbon atoms and in which each alkyl group contains from 1 to 3 carbon atoms and present in an interpolymerized amount sufficient to form an interpolymer having a glass-transition temperature less than about −25° C. and an entanglement molecular-weight greater than about 20,000; and wherein the pressure-sensitive adhesive is a hot-melt applied and radiation cross-linked after application in the presence of a multifunctional monomer selected from the group consisting of pentaerythritol triacrylate, tetraethylene glycol dimethacrylate and trimethylol propane trimethacrylate.

2. A pressure-sensitive adhesive as claimed in claim 1 in which the tackifier monomer is diethyl fumarate.

3. A pressure-sensitive adhesive as claimed in claim 1 in which the first monomer is selected from the group consisting of 2-ethylhexyl acrylate and butyl acrylate.

4. A pressure-sensitive adhesive as claimed in claim 2 in which the first monomer is selected from the group consisting of 2-ethylhexyl acrylate and butyl acrylate.

5. A pressure-sensitive adhesive as claimed in claim 1 in which the unsaturated carboxylic acid is acrylic acid.

6. A pressure-sensitive adhesive as claimed in claim 4 in which the second monomer is acrylic acid and is present in an amount of from about 1% to about 25% by weight based on the total weight of the monomers.

7. A pressure-sensitive adhesive as claimed in claim 1 in which the multifunctional monomer is present in an amount of up to about 8% by weight of the total monomers.

8. A pressure-sensitive adhesive as claimed in claim 1 in which the multifunctional monomer is present in amount of from about 1% to about 5% by weight of the total monomers.

9. A pressure-sensitive adhesive as claimed in claim 4 in which the multifunctional monomer is present in an amount of from about 1% to about 5% by weight of the total monomers.

10. A cured pressure-sensitive adhesive formed of a copolymer comprised of:

at least one first monomer having a glass-transition temperature less than about −25° C. and an entanglement molecular-weight greater than about 20,000 and present in amount of from about 55% to about 90% by weight based on the total weight of the monomers and including an alkyl acrylate selected from the group consisting of 2-ethylhexyl acrylate and butyl acrylate;

an interpolymerized amount of at least one second monomer having a glass-transition temperature greater than about −25° C. and an entanglement molecular-weight less than about 20,000 said second monomer being an unsaturate carboxylic acid and including arcylic acid and present in an amount of up to about 25% by weight based on the total weight of the monomers; and at least one tackifier monomer having a glass transition greater than about −25° C. and an entanglement molecular-weight of at least about 20,000 and being diethyl fumarate, said tackifier monomer being present in the interpolymer in an amount sufficient to form a hot-melt adhesive having a glass-transition temperature less than about −25° C. and an entanglement molecular-weight greater than about 20,000; wherein said pressure-sensitive adhesive is hot-melt applied and radiation cured by electron beam radiation after application as a hot-melt and in the presence of a multifunctional monomer selected from the group consisting of pentaerythritol triacrylate, tetraethylene glycol dimethacrylate and trimethylol propane trimethacrylate.

11. A pressure-sensitive adhesive as claimed in claim 10 in which the multifunctional monomer is present in an amount of up to about 8% by weight of the total monomers.

12. A pressure-sensitive adhesive as claimed in claim 10 in which multifunctional monomer is present in an amount of from about 1% to about 5% by weight of the total monomers.

* * * * *